United States Patent [19]
Takizawa et al.

[11] Patent Number: 5,587,420
[45] Date of Patent: Dec. 24, 1996

[54] DIENE POLYMER OBTAINED BY ADDING A TIN COMPOUND IN THE POLYMERIZATION WITH AN ORGANOLITHIUM INITIATOR

[75] Inventors: Toshiki Takizawa; Yasuo Horikawa; Taro Akazawa, all of Tokyo, Japan

[73] Assignee: Bridgestone Corporation, Tokyo, Japan

[21] Appl. No.: 70,793

[22] Filed: Jun. 3, 1993

[30] Foreign Application Priority Data

| Jun. 4, 1992 | [JP] | Japan | 4-144517 |
| Jun. 4, 1992 | [JP] | Japan | 4-144518 |
| Jun. 4, 1992 | [JP] | Japan | 4-144519 |
| Sep. 29, 1992 | [JP] | Japan | 4-260233 |
| Oct. 22, 1992 | [JP] | Japan | 4-284430 |

[51] Int. Cl.$^6$ .............. C08L 9/00; C08K 3/04; C08F 4/16; C08F 4/48
[52] U.S. Cl. .............. 524/572; 524/571; 524/575; 525/332.9; 525/333.2; 525/352; 525/370; 525/371; 525/374; 526/86; 526/173; 526/176; 526/335; 526/340
[58] Field of Search .............. 526/176, 66, 86, 526/173, 335, 340; 525/370, 371, 374, 352, 250, 271, 272, 332.9, 333.2; 524/571, 572, 575

[56] References Cited

U.S. PATENT DOCUMENTS

| 3,468,972 | 9/1969 | Hsieh | 525/337.2 X |
| 3,536,691 | 10/1970 | Trepka et al. | 526/176 |
| 4,145,998 | 3/1979 | Farrar | 526/181 X |
| 4,616,069 | 10/1986 | Watanabe et al. | 525/370 |
| 4,845,165 | 7/1989 | Halasa et al. | 525/237 X |
| 5,268,439 | 12/1993 | Hergenrother et al. | 526/176 X |

FOREIGN PATENT DOCUMENTS

| 0419433 | 3/1963 | Japan . |
| 46-27069 | 8/1971 | Japan . |
| 47-13532 | 4/1972 | Japan . |
| 47-17449 | 5/1972 | Japan . |
| 47-42729 | 10/1972 | Japan . |
| 55-60539 | 5/1980 | Japan . |
| 56-163908 | 12/1981 | Japan . |
| 57-55912 | 4/1982 | Japan . |
| 57-70137 | 4/1982 | Japan . |
| 57-55941 | 4/1982 | Japan . |
| 63-235305 | 9/1988 | Japan . |

OTHER PUBLICATIONS

Hackh's Chemical Dictionary, 4th ed., Mc–Graw Hill, Inc., N.Y., pp. 92, 22, 510 (1969).

*Primary Examiner*—Fred Teskin
*Attorney, Agent, or Firm*—Sughrue, Mion, Zinn, Macpeak & Seas

[57] ABSTRACT

In one of several methods of producing polybutadiene or a butadiene-styrene copolymer with an organolithium initiator, an organotin compound such as tetraallyltin, tetrabenzyltin and tetraphenyltin is added to the polymerization system in a period of growth of the polymer chain between a time immediately after a start of the polymerization to a time before an end of the polymerization. In another of the methods, tin tetrachloride or tin dichloride is added at an earlier time after a start of the polymerization. A polymer comprising a considerable amount of high molecular weight polymer containing the chain having a tin-carbon linkage is formed. A rubber composition for tires comprises specified amounts of the polymer described above, natural rubber, carbon black and vulcanizing agents. The rubber composition has a small loss factor and excellent fracture properties. The rubber composition provides a tire having excellent wear resistance, low rolling resistance and wet skid resistance without impairing fracture properties. In addition, the rubber composition is inexpensive.

27 Claims, No Drawings

DIENE POLYMER OBTAINED BY ADDING A TIN COMPOUND IN THE POLYMERIZATION WITH AN ORGANOLITHIUM INITIATOR

BACKGROUND OF THE INVENTION

1. Field of the Invention

The present invention is related to a method of producing a diene polymer by which the polymer comprising a high molecular weight polymer containing the chain having a tin-carbon linkage as the main component thereof and consequently having low hysteresis loss can be obtained with excellent productivity and inexpensively. The present invention is also related to a rubber composition for tires having excellent wear resistance, low rolling resistance and excellent wet skid resistance without adversely effecting on fracture properties by using the diene polymers.

2. Description of Related Art

Because the reduction of fuel cost of automobiles is required, rubbers having low hysteresis loss are desired for material rubbers of tread parts of tires. As the rubber materials having low hysteresis loss, natural rubber, cis-1,4 polyisoprene and low cis-1,4 or high cis-1,4 polybutadiene are known. As rubber materials in which the low hysteresis loss property is remarkably improved, polymers obtained by coupling a halogenated tin compound to the end of the polymer prepared by polymerization with an organolithium compound as the initiator in a hydrocarbon solvent are known (Japanese Patent Application Laid Open No. 1982-55912 and others). In the method of producing these polymers, when a halogenated tin compound is brought into reaction with the end of the polymer, the polymerization system is converted to the deactivated state at the time of the addition of the tin compound and the residual monomer is considered to be left remaining without reaction. Thus the molecular structure of the polymer obtained is fixed to a certain structure at the time of the addition of the tin compound, and the polymer has the molecular structure containing tin in the chain. Therefore, the tin compound is generally added at the time when the polymerization is finished because of the requirement of the reaction which is related to the economy of the production and the requirement of the molecular structure which is related to the molecular design. As described above, in the heretofore known methods of production by using a modifier such as coupling agents like halogenated tin compounds, the modifier is added after the reaction is finished, and, even when the unreacted monomer is remaining, the reaction system is sent to the following process to recover the polymer of the purpose. This means that a batch process is adopted as the reaction process. However, the batch process has lower productivity than the continuous process, and the production cost of the polymer is increased to cause a higher price of the polymer, leading to a major drawback.

On the other hand, when the continuous process of polymerization, which is well known as an inexpensive method, is assumed to be the primary factor to be considered, some such methods can be found. As the first of such methods, the method of producing a blend of diene rubbers by using an organolithium compound as the initiator is mentioned (Japanese Patent Application Laid Open No. 1988-235305). In this method, a branching agent such as tin tetrachloride is added in the middle period of the copolymerization of butadiene and styrene (30 to 70% conversion) to form a low molecular weight polymer containing the chain having a tin-carbon linkage by the coupling of 20 to 70% of the polymer and a high molecular weight polymer containing no chain having tin-carbon linkage which is formed by the continued polymerization with the remaining active ends. Further, a polymer blend containing the high molecular weight polymer as the main component is formed. This method of production has the object of obtaining an inexpensive polymer having the improved processability by producing a low molecular weight polymer and a high molecular weight polymer in the process of the polymerization instead of using the ordinary method of blending.

As the second of such methods, the method of producing polybutadiene or polyisoprene for improvement of processability is mentioned (U.S. Pat. No. 3,536,691). This method has the object of obtaining the polymer having improved processability by adding allyltin as the modifier in the middle period of the polymerization when a monomer is polymerized in the presence of a special kind of lithium compound which is a haloaryllithium. Like the method described above, this method does not positively introduce the chain having a tin-carbon linkage into the molecular chain of a high molecular weight polymer, and the object is not to obtain a polymer having low hysteresis loss.

As still another method, the method of producing conjugated diene polymers for improvement of cold flow of the polymer can be mentioned (Japanese Patent Publication 1966-9433). In this method, a compound having the formula $R'_4M$ (wherein $R'$ is a vinyl group, an alkyl group, a cycloalkyl group or an aryl group, at least two of the four groups are vinyl groups and M is silicon, germanium, tin or lead) is added to the polymerization mixture before completing the polymerization in the method of producing polybutadiene or polyisoprene in the presence of an organometallic compound of lithium or aluminum or a catalyst containing metallic lithium. As $R'_4M$, for example, divinyldimethylsilane and the like are used, and these compounds are generally known to react as divinyl compounds like divinylbenzene to cause the crosslinking reaction when they are used in the anionic polymerization. This method is used for improving the cold flow by introducing a branched structure in the main chain of polymer by using $R'_4M$ and not for positively introducing the chain having a metal-carbon linkage.

These examples show that, though methods of the continuous polymerization are known, a method of producing an excellent polymer having low hysteresis loss by the continuous process has not been known.

Because low fuel cost and safety are both required for automobiles, improvement of low rolling resistance (low hysteresis loss), wear resistance and wet skid resistance are desired for rubber compositions used for the tread part of tires.

For decreasing the rolling resistance of rubber compositions for the tread part, properties of the polymer comprised in the rubber composition were focused upon, and natural rubber, polyisoprene rubber, polybutadiene rubber and the like have heretofore been used as the low hysteresis loss polymer. However, the following problem arose because rolling resistance and wet skid resistance are contradicting properties: when a rubber composition containing these polymers were used, the wet skid resistance of a tire was decreased in the condition where the rolling resistance could be decreased, and on the other hand, the rolling resistance of the rubber composition could not be decreased when the wet skid property was improved because the amounts of compounding of reinforcing agents like carbon black and plasticizers like oil had to have been increased for the improvement.

For creating a proper balance between wear resistance, rolling resistance and wet skid property, blending of polymers having different content of the bound styrene or the content of the vinyl linkage in the butadiene part was examined as the styrene-butadiene copolymer comprised in the rubber composition (Japanese Patent Applications Publication Nos. 1971-28069, 1972-42729, 1972-13532, 1972-17449 Japanese Patent Application Laid-Open Nos., 1980-60539, 1981-163908, 1982-70137 and 1982-55941). However, the increase of the content of the bound styrene increased the wet skid resistance but did not decrease the rolling resistance.

Furthermore, when the vinyl content of the butadiene part of styrene-butadiene copolymer in the rubber composition was increased, the fracture properties and the wear resistance were decreased even though the wet skid property of the tire using this rubber composition improved. Therefore, when the above descriptions are considered together, optimization of the content of the bound styrene, the microstructure of the butadiene part, the distribution of components in the molecular chain and the molecular weight distribution alone are insufficient for obtaining a rubber composition favorable for a tire tread satisfying the requirement of low fuel cost which corresponds to the requirement of low rolling resistance (low hysteresis loss) of the rubber compounds.

SUMMARY OF THE INVENTION

The present invention accordingly has an object to provide a method of producing a diene polymer by which a polymer comprising a high molecular weight polymer containing the chain having a tin-carbon linkage as the main component thereof and consequently having low hysteresis loss can be obtained with excellent productivity and inexpensively. Another object of the invention is to provide a polymer having the structure and the properties described above. Still another object of the present invention is to provide a rubber composition for tires having excellent wear resistance, low rolling resistance and excellent wet skid resistance without adversely effecting on fracture properties by using the diene polymers.

(1) Thus, the method of producing a polymer of the present invention comprises polymerizing a conjugated diene monomer or a mixture of a conjugated diene monomer and a vinylaromatic hydrocarbon monomer in a hydrocarbon solvent by using an organolithium compound as the initiator with the addition of an organotin compound expressed by the formula $SnR_4$, in which R are the same or different molecular structure groups having the connecting part to tin selected from the group consisting of allyl structures, benzyl structures and phenyl structures, to the polymerization system in a period of growth of the polymer chain between a time immediately after a start of the polymerization to a time before an end of the polymerization.

(2) The high molecular weight polymer of the present invention is produced by method (1) described above.

(3) The rubber composition for tires of the invention comprises 100 weight parts of a rubber material containing 30 weight parts or more of a high molecular weight polymer which is produced by method (1) described above, 20 to 100 weight parts of carbon black and 0.1 to 5 weight parts of vulcanizing agents based on 100 weight parts of the rubber material, respectively. The rubber composition for tires has low hysteresis loss, high wear resistance, low rolling resistance and high wet skid resistance.

(4) The method of producing a polymer of the invention also comprises: polymerizing a conjugated diene monomer or a mixture of a conjugated diene monomer and a vinylaromatic hydrocarbon monomer in a hydrocarbon solvent by using an organolithium compound as the initiator; adding a halogenated tin compound expressed by the formula $SnX_n$, in which X is a halogen and n is an integer of 2 or 4, to the polymerization system in a period of growth of the polymer chain between a time immediately after a start of the polymerization to a time of 80 % conversion in an amount of less than 0.5 to 0.12 or more mol equivalent based on 1 mol equivalent of the lithium at the active end of the polymer when n is 2 and in an amount of less than 0.25 to 0.18 or more mol equivalent based on 1 mol equivalent of the lithium at the active end of the polymer when n is 4; and forming a polymer containing 40% or more of a high molecular weight polymer containing the chain having the tin-carbon linkage.

(5) The high molecular weight polymer of the present invention also comprises 40% or more of a high molecular weight polymer containing the chain having the tin-carbon linkage and is produced by method (4) described in the above.

(6) The rubber composition for tires of the present invention also comprises 100 weight parts of a rubber material containing 30 weight parts or more of a high molecular weight polymer which comprises 40% or more of a high molecular weight polymer having tin-carbon linkages and is produced by method (4) described above, 20 to 100 weight parts of carbon black and 0.1 to 5 weight parts of vulcanizing agents based on 100 weight parts of the rubber material, respectively. The rubber composition for tires has low hysteresis loss, high wear resistance, low rolling resistance and high wet skid resistance.

Other objects, features and advantages of the invention will be understood more fully from the following description.

DETAILED DESCRIPTION OF THE INVENTION

As the result of intensive studies by the present inventors, it was surprisingly discovered that, when the organotin compound or the halogenated tin compound of the invention was added to the system after the initiation of the polymerization, a polymer containing a chain having a tin-carbon linkage was formed. The polymer thus obtained was activated, and an initiation point of the polymerization is formed on this polymer. Thereby, the monomer was further polymerized continuously, and a high molecular weight polymer containing the chain having the tin-carbon linkage was obtained by the growth of the chain. This discovery reveals a new fact replacing the heretofore accepted view that a polymer containing a tin-carbon linkage does not have the polymerization activity and that the polymerization cannot be continued, thus leading to the adoption of the batch method of polymerization.

More specifically, when a suitable amount of the organotin compound or the halogenated tin compound is added after the initiation of the polymerization in the random copolymerization of butadiene and styrene by using butyllithium as the initiator in the presence of an ether compound or the like in a hydrocarbon solvent, the ability to continue the polymerization is newly acquired by the formed polymer containing the chain having the tin-carbon linkage by the interaction of the lithium at the active end of the polymerization and the organotin compound or the halogenated tin compound. The growth of the polymerization chain is continued further to obtain the random type butadiene-styrene copolymer of high molecular weight containing the chain having the tin-carbon linkage. This result shows that the continuous method of polymerization having a high productivity is made possible by the method of production of the invention. The polymer obtained showed remarkably decreased hysteresis loss. It was also found that the rubber composition containing this polymer had excellent wear resistance, low rolling resistance and excellent wet skid resistance.

The finding that the polymer containing the chain having the tin-carbon linkage has the ability to continue the polymerization is described in further detail hereinafter. For example, when the molecular weight of the polymer expressed by the number average molecular weight reached $1.8 \times 10^4$ in the homopolymerization of butadiene by using butyllithium as the initiator, and then $SnCl_2$ used as the halogenated tin compound was added in an amount of 0.43 mol equivalent based on 1 mol equivalent of lithium at the active end of the polymer, the number average molecular weight of the polymer increased to $5.4 \times 10^4$. The polymerization was continued further. As the result, a new fact that the number average molecular weight of the polybutadiene containing the chain having the tin-carbon linkage contained in the total polymer reached the value of $50 \times 10^4$ was found.

The mechanism by which the polymer containing the chain having the tin-carbon linkage acquires the ability to continue the polymerization is not clear yet, but it can be considered that the active point of the polymerization is formed by some kind of interaction between the lithium at the active end of the polymer and the tin compound of the invention.

The present invention is described in more detail hereinafter.

The solvent for the polymerization is an inert organic solvent. For example, an aromatic hydrocarbon solvent, such as benzene, toluene, xylene and the like, an aliphatic hydrocarbon solvent, such as n-pentane, n-hexane, n-heptane and the like, an alicyclic hydrocarbon solvent, such as methylcyclopentane, cyclohexane and the like, or a mixture of these solvents can be used.

Examples of the organolithium compound used as the initiator in the method of production of the present invention are alkyllithiums, such as n-butyllithium, ethyllithium, propyllithium, tert-butyllithium, hexyllithium, 1,4-dilithiobutane, reaction products of butyllithium and divinylbenzene and the like, alkylenedilithiums, phenyllithium, stilbenedilithium and the like. The preferable examples are n-butyllithium and tert-butyllithium. The organolithium initiator may be used singly or as a mixture of two or more kinds. The organolithium compound can be used in an amount in the range of 0.2 to 30 millimol per 100 g of the monomer.

The monomer used in the polymerization in the present invention is a conjugated diene or a mixture of a conjugated diene and vinylaromatic hydrocarbon. The conjugated diene is a conjugated diene hydrocarbon having 4 to 12 carbon atoms, preferably 4 to 8 carbon atoms, in a molecule. Examples of the conjugated diene are 1,3-butadiene, isoprene, 2,3-dimethyl-1,3-butadiene, 1,3-pentadiene, octadiene and the like. The conjugated diene may be used singly or as a combination of two or more kinds. The particularly preferable example is 1,3-butadiene.

Examples of the vinylaromatic hydrocarbon described above include styrene, α-methylstyrene, p-methylstyrene, o-methylstyrene, p-butylstyrene, vinylnaphthalene and the like compounds. Among them, styrene is particularly preferable.

In the organotin compound expressed by the formula $SnR_4$ used in the method of the present invention, the group expressed by R in the formula is a molecular structure group having the connecting part to tin selected from the group consisting of an allyl structure, a benzyl structure and a phenyl structure, and the four R may be the same or different from each other.

When the molecular structure group having the connecting part to tin is an allyl structure, examples of the allyl structure are allylic groups, such as allyl group, 2-butenyl group, 2-pentenyl group, cinnamyl group and the like, and polymeric groups or oligomeric groups in which the connecting part to tin is the diene polymer unit or the diene oligomer unit, respectively. Examples of such polymeric groups are polybutadiene, butadiene-styrene copolymers, polyisoprene, isoprene-styrene copolymers and the like in which the connecting part to tin is the diene polymer unit. Examples of such oligomeric groups are oligomers corresponding to these diene polymers and the like in which the connecting part to tin is the diene oligomer unit. The preferable examples are allyl group and polymeric groups of polybutadiene or butadiene-styrene copolymers and oligomeric groups corresponding to these polymeric groups of dienes in which the connecting part to tin is the diene polymer unit or the diene oligomer unit, respectively.

When the molecular structure group having the connecting part to tin is a benzyl structure, examples of the benzyl structure are benzylic groups, such as benzyl group, α-methylbenzyl group, diphenylmethyl group and the like, and polymeric groups or oligomeric groups in which the connecting part to tin is vinylaromatic hydrocarbon polymer unit or vinylaromatic hydrocarbon oligomer unit, respectively. Examples of such polymeric groups are polystyrene, styrene-butadiene copolymers, styrene-isoprene copolymers and the like in which the connecting part to tin is vinylaromatic hydrocarbon polymer unit. Examples of such oligomeric groups are oligomers corresponding to these styrenic polymers and the like in which the connecting part to tin is vinylaromatic hydrocarbon oligomer unit. The preferable examples are benzyl group and polymeric groups of polystyrene and styrene-butadiene copolymers and oligomeric groups corresponding to these polymeric groups of styrenic copolymers in which the connecting part to tin is vinylaromatic hydrocarbon polymer unit or vinylaromatic hydrocarbon oligomer unit, respectively.

When the molecular structure group having the connecting part to tin is a phenyl structure, examples of the phenyl structure are groups derived from phenyl compounds, such as phenyl group, tolyl group, naphthyl group and the like. The preferable examples are phenyl group and toluyl group.

More specific examples of the formula $SnR_4$ are: when the R in the formula are the same, tetraallyltin, tetrapolybutadienyltin, tetrabenzyltin, tetrapolystyryltin, tetraphenyltin and the like; and when the R are different, allyltriphenyltin, diallyldiphenyltin and the like. Vinyltriphenyltin and the like can also be used.

It is necessary that all of the R in the formula $SnR_4$ of the invention are the molecular structure group of the allyl structure, the benzyl structure and/or the phenyl structure. When at least one of the R is a group other than the groups described above, such as an alkyl group for example, the compound is not preferable because the polymer containing the chain having the tin-carbon bond is not formed, and the hysteresis loss of the rubber component and the rolling resistance of the rubber composition using the rubber component are increased.

The amount of the organotin compound expressed by the formula $RSn_4$ in the method of the present invention to the lithium at the active end of the polymer is not particularly limited. When, for example, tin tetrachloride is used as the coupling agent, as is the case in conventional methods, it is well known that the polymerization activity is completely lost when the mol equivalent ratio of the tin compound/lithium is more than 0.25. In the method using the organotin compound as a coupling agent, the polymerization activity is sufficiently retained although it is smaller even when the ratio is more than 1, for example, because the mechanism of the reaction is different.

The halogenated tin compound of the present invention is expressed by the formula $SnX_n$. When n=2, the compound is expressed by the formula $SnX_2$. When n=4, the compound is expressed by the formula $SnX_4$.

Examples of $SnX_2$ are tin dichloride, tin dibromide and the like. The amount of $SnX_2$ added to the reaction system is in the range of less than 0.5 to 0.12 or more mol equivalent based on 1 mol equivalent of the lithium at the active end of the polymer.

Examples of $SnX_4$ are tin tetrachloride, tin tetrabromide and the like. The amount of $SnX_4$ added to the reaction system is in the range of less than 0.25 to 0.18 or more mol equivalent based on 1 mol equivalent of the lithium at the active end of the polymer.

When the amount of addition of the halogenated tin compound to the lithium at the active end of the polymer is 0.5 mol equivalent or more in the case of $SnX_2$ and 0.25 mol equivalent or more in the case of $SnX_4$, the polymerization is not continued at all because the lithium at the active end of the polymer no longer remains and the polymer containing the chain having the tin-carbon linkage is not formed. When this amount is less than 0.12 in the case of $SnX_2$ and less than 0.18 in the case of $SnX_4$, the relative concentration of lithium at the free active end of polymer, which is considered to be irrelevant to the formation of the starting point of the polymer containing the chain having the tin-carbon linkage, to the concentration of the starting point of the polymer containing the chain having the tin-carbon linkage is increased even though the chain of the polymer containing the chain having the tin-carbon linkage is formed. Thus, the polymerization which does not effect the tin at the active end proceeds predominantly. The ratio of the polymer containing the chain having the tin-carbon linkage relative to the polymer containing no chain having the tin-carbon linkage in the obtained polymer is decreased, and the content of the former polymer in the total polymer obtained is reduced to less than 50%, sometimes less than 40%. This causes inferior results with respect to the desired properties, and is therefore unfavorable.

In the present invention, the time at which the organotin compound or the halogenated tin compound is added is the important factor. When the organotin compound is used, the organotin compound is added to the polymerization system in the period of growth of the polymer chain between the time immediately after the start of the polymerization by an organolithium compound to the time before the end of the polymerization, preferably to the time of 80% conversion, more preferably to the time of 25% conversion. When the halogenated tin compound is used, the halogenated tin compound is added to the polymerization system in the period of growth of the polymer chain between the time immediately after the start of the polymerization by an organolithium compound to the time of 80% conversion, preferably to the time of 25% conversion. When the time of the addition is in the period between the time immediately after the start of the polymerization to the end of the polymerization or to the time of 80% conversion, the sufficient effect can be obtained. However, it is preferable that the organotin compound is added at the early period of the polymerization, such as the period between the time immediately after the start of the polymerization to the time of 25% conversion for the following reasons: efficiency of the coupling is better in the period of low viscosity immediately after the start of the polymerization; the deactivation of lithium at the active end of the polymer caused by various reasons is small; the high molecular weight polymer containing the chain having the tin-carbon linkage is obtained efficiently; and the continuous method of polymerization can be performed with good stability. When the organotin compound or the halogenated tin compound is added before the start of the polymerization, the polymer of the object of the present invention cannot be obtained. When the organotin compound or the halogenated tin compound is added after the polymerization is finished, the advantage of the continuous method of polymerization is lost. Thus, addition at a time outside of the specified ranges is not preferable.

The amount of the organotin compound expressed by the formula $R_4Sn$ or the halogenated tin compound expressed by the formula $SnX_n$ which is added to the lithium at the active end of the polymer can be expressed by the mol equivalent ratio of tin/lithium. This ratio affects the polymerization activity, the content of the polymer containing the chain having the tin-carbon linkage in the polymer and the molecular weight of the polymer to a great extent. When the mol equivalent ratio of tin/lithium is increased, the polymerization activity is decreased, and a relatively low molecular weight polymer which includes a larger amount of the polymer containing the chain having the tin-carbon linkage is obtained. On the other hand, when this ratio is decreased, the inverse tendency appears: the polymerization activity is increased, and a relatively high molecular weight polymer which includes a smaller amount of the polymer containing the chain having the tin-carbon linkage is obtained. When the content of the polymer containing the chain having the tin-carbon linkage in the rubber material of the present invention is higher, the hysteresis loss is lower, and consequently the rolling resistance of the rubber composition using the polymer is lower. Thus, a higher content of this polymer is favorable. The method of the present invention can result in a considerably higher content than the conventional methods. Because the content of this high molecular weight polymer depends on the ratio of the lithium and the organotin compound or the halogenated tin compound as described above, polymers suited for the applications can be obtained easily as desired by selecting the amount of addition of the tin compound relative to the amount of the lithium at the active end of the polymer.

For the purpose of increasing the polymerization activity and/or the adjustment of the molecular structure of the polymer, such as the molecular weight, the microstructure and, additionally in the case of copolymers, the compositions of the monomer units, the distribution of the monomer units and the like, as desired according to the applications, additives generally used for these purposes, such as Lewis bases like ether compounds, tertiary amine compounds and the like, may be added to the reaction system. Examples of the ether compound are: diethyl ether, dibutyl ether, tetrahydrofuran, 2-methoxytetrahydrofuran, 2-methoxymethyltetrahydrofuran, dioxane, ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether and the like. Examples of the tertiary amine are: triethylamine, tripropylamine, pyridine, N,N,N',N'-tetramethylethylenediamine, N,N,N',N'-tetraethylethylenediamine, N-methylmorpholine and the like. The amount of the ether compound or the tertiary amine compound is in the range of 0.05 to 1000 mol based on 1 mol of the organolithium compound.

The temperature of polymerization is generally in the range of −20° to 150° C. and preferably in the range of 0° to 120° C.

The concentration of the monomer in the solvent is generally in the range of 5 to 50 weight % and preferably in the range of 10 to 35 weight %. In the case of the copolymerization of a conjugated diene and a vinylaromatic hydrocarbon, the content of the vinylaromatic hydrocarbon in the charged monomer is in the range of 3 to 50 weight % and preferably in the range of 5 to 40 weight %.

The polymerization reaction can be performed by bringing the monomer into contact with the catalyst in the liquid phase. It is preferred that the reaction is operated under the pressure sufficient for essentially holding the liquid phase. It is also preferred that substances adversely affecting the catalytic activity are eliminated from all of the substances charged into the reaction system.

After the reaction is finished, the polymer can be recovered by removing the solvent by steam-stripping the polymer solution or by coagulating the polymer by addition of a poor solvent like methanol into the polymer solution followed by drying the coagulated polymer by using heated rolls or under reduced pressure. The polymer can be obtained also by removing the solvent from the polymer solution directly with heated rolls or under reduced pressure.

The polymer of the present invention contains the high molecular weight polymer containing the chain having the tin-carbon linkage. The polymer obtained by using $SnX_n$ contains the high molecular weight polymer containing the chain having the tin-carbon linkage in an amount of 40 weight % or more of the total polymer. The amount can be increased to 50% or more and even 70% or more of the total polymer obtained when the conditions are suitably selected. This high amount contributes to the low hysteresis property of the polymer to a great extent.

The polymer of the present invention comprises a homopolymer of a conjugated diene, a copolymer of a conjugated diene and a vinylaromatic hydrocarbon or a mixture of these polymers.

High molecular weight polybutadiene or high molecular weight butadiene-styrene copolymer is particularly favorably used, and the high molecular weight polymer containing the chain having the tin-carbon linkage is comprised in these polymers.

The molecular weight of the high molecular weight polymer of the present invention can be controlled as desired by the concentration of the organolithium compound and the kind and the added amount of the organotin compound or the halogenated tin compound. The molecular weight distribution of the polymer of the invention is not always monodispersed. Therefore, representation of the molecular weight using only one of the number average molecular weight and the weight average molecular weight is sometimes not accurate. When the molecular weight is represented by the number average molecular weight taking this fact into consideration, a polymer having the molecular weight of $10 \times 10^4$ to $50 \times 10^4$, for example, can be easily produced. There is a suitable range of the molecular weight from the requirement of physical properties. When the molecular weight is too low, the effect of decrease of the hysteresis loss by the addition of the tin compound of invention is not sufficient, and the wear resistance is also inferior. When the molecular weight is too high, processability in compounding and dispersion of carbon black are inferior and the low hysteresis property and/or the wear resistance are also inferior, thus the condition being unfavorable.

In the present invention, when the continuous method of the polymerization of the invention has to be suspended or finished by the reason of the process or when the molecular design is changed and a different property as desired is to be provided to the polymer, a compound selected from the group consisting of a tin compound, a compound containing isocyanate groups and a compound containing a —CM—N< linkage, wherein M is oxygen or sulfur, is added as the modifier after finishing the polymerization.

Examples of the tin compound described above are halogenated tin compounds, such as tin tetrachloride, tin tetrabromide and the like, halogenated organotin compounds, such as diethyltin dichloride, dibutyltin dichloride, tributyltin chloride, diphenyltin dichloride, triphenyltin chloride and the like, and other such compounds.

Examples of the isocyanate compound described above are aromatic polyisocyanate compounds, such as phenyl isocyanate, 2,4-tolylene diisocyanate, 2,6-tolylene diisocyanate, diphenylmethane diisocyanate, naphthalene diisocyanate, dimers and trimers of these compounds and the like.

Examples of the compound containing a —CM—N< linkage described above are: amide compounds, such as formamide, N,N-dimethylformamide, acetamide, N,N-diethylacetamide, aminoacetamide, N,N,-dimethyl-N',N'-dimethylaminoacetamide, N,N-dimethylaminoacetamide, N,N-dimethyl-N'-ethylaminoacetamide, acrylamide, N,N-dimethylacrylamide, N,N-dimethylmethacrylamide, nicotinamide, isonicotinamide, picolinic acid amide, N,N-dimethylisonicotinamide, succinamide, phthalamide, N,N,N',N'-tetramethylphthalamide, oxamide, N,N,N',N-tetramethyloxamide, 1,2-cyclohexanedicarboxylic acid amide, 2-furancarboxylic acid amide, N,N-dimethy-2-furancarboxylic acid amide, quinoline-2-carboxylic acid amide, N-ethyl-N-methylquinolinecarboxylic acid amide and the like; imide compounds, such as succinimide, N-methylsuccinimide, maleimide, N-methylmaleimide, phthalimide, N-methylphthalimide and the like; lactam compounds, such as ε-caprolactam, N-methyl-ε-caprolactam, 2-pyrrolidone, N-methyl-2-pyrrolidone, 2-piperidone, N-methyl-2piperidone, 2-quinolone, N-methyl-2-quinolone and the like; urea compounds, such as urea, N,N'-dimethylurea, N,N-diethylurea, N,N,N',N'-tetramethylurea, N,N-dimethyl-N',N'-diphenylurea, N,N'-dimethylethyleneurea and the like; carbamic acid derivatives, such as methyl carbamate, methyl N,N-diethylcarbamate and the like; isocyanuric acid derivatives, such as isocyanuric acid, N,N',N''-trimethylisocyanuric acid and the like; compounds containing thiocarbonyl group corresponding to these compounds; and other such compounds. The modifier is not particularly limited so long as it is a compound which reacts with the active end of the polymer chain.

A polymer, for example polybutadiene, having the molecular structure, such as the microstructure of the butadiene part (cis-1,4, trans-1,4 and vinyl), freely selected according to the purpose and a copolymer, for example a copolymer of butadiene and styrene, having the composition of butadiene/styrene and the distribution of the composition (random structure, block structure and a mixed structure of random structure and block structure), also freely selected according to the purpose can be easily obtained and adopted to various applications.

In the present invention, the content of the vinyl structure derived from the conjugated diene, particularly from 1,3-butadiene, contained in the polymer is preferably in the range of 10 to 70weight %. When the content is more than 70 weight %, the fracture properties are decreased although the wet skid resistance is increased. Therefore, the content of more than 70 weight % is not preferable. The content of the vinylaromatic hydrocarbon in the copolymer, particularly the content of the bound styrene, is preferably in the range of 3 to 50 weight %. When the content is more than 50 weight %, the rolling resistance is inferior although the wet skid resistance is increased. Therefore, the content of more than 50 weight % is not preferable.

The material rubbers for the rubber composition of the present invention include in practice the materials used by blending the polymer described above with natural rubber or other synthetic rubbers. When the material is used by blending, it is necessary that the polymer described above is comprised in an amount of 30 weight % or more, preferably 50 weight % or more, in the rubber material. When the amount is less than 30 weight %, the wet skid resistance is decreased and the balance of the properties required of the rubber composition deteriorates. Thus, an amount less than 30 weight % is unfavorable.

Examples of the synthetic rubber used for the blending described above are cis-1,4-polyisoprene, styrene-butadiene copolymers, low cis-1,4-polybutadiene, high cis-1,4-polybutadiene, ethylene-propylene-diene copolymers, chloroprene polymers, halogenated butyl rubbers, acrylonitrile-butadiene rubber (NBR) and the like.

The amount of carbon black compounded in the rubber composition of the invention is in the range of 20 to 100 weight parts, preferably in the range of 25 to 80 weight parts, based on the rubber material described above. When the amount is less than 20 weight parts, the tensile strength and the wear resistance of the vulcanized product is insufficient. When the amount is more than 100 weight parts, the amount is not preferable with respect to the rolling resistance (hysteresis loss) and the like. A carbon black, such as HAF, ISAF, SAF and the like, can be used for the rubber composition. Carbon blacks having the iodine absorption (IA) of 60 mg/g or more and the absorption of dibutyl phthalate (DBP) of more than 80 ml/100 g are preferably used.

The vulcanizing agent is sulfur or the like. The amount of the vulcanizing agent is in the range of 0.1 to 5 weight parts, preferably in the range of 1 to 2 weight parts based on 100 weight parts of the rubber material. When the amount is less than 0.1 weight parts, the tensile strength, the wear resistance and the hysteresis loss are inferior. When the amount is more than 5 weight parts, the rubbery resilience is lost.

The process oil which can be used in the present invention is a paraffinic oil, a naphthenic oil or an aromatic oil. The aromatic oil is used for applications in which tensile strength and wear resistance are important. The naphthenic oil or the paraffinic oil is used for applications in which the hysteresis loss and the low temperature properties are important. The amount used is in the range of 0 to 100 weight parts based on 100 weight parts of the rubber material. When the amount is more than 100 weight parts, the tensile strength and the hysteresis property of the vulcanized rubber deteriorates to a great extent.

The vulcanization accelerator which can be used in the invention is not particularly limited and preferable examples are thiazole accelerators, such as M (2-mercaptobenzothiazole), DM (dibenzothiazyl disulfide), CZ (N-cyclohexyl-2-benzothiazylsulfenamide) and the like, and guanidine accelerators, such as DPG (diphenylguanidine) and the like. The amount used is in the range of 0.1 to 5 weight parts, preferably in the range of 0.2 to 3 weight parts, based on 100 weight parts of the rubber material.

In the rubber composition of the present invention, other additives generally used in the rubber industry, such as aging resisting agents, fillers other than carbon black like silica, calcium carbonate, titanium oxide and the like, zinc oxide, stearic acid, antixodants, antiozonants and the like, can be compounded in addition to the materials described above.

The rubber composition of the present invention can be obtained by using mixing machines such as rolls, internal mixers and the like. After the processing by molding, the rubber composition is vulcanized and applied to tire applications, such as tire tread, under tread, carcass, side wall, bead parts and the like, as well as to other industrial products such as antivibration rubbers, belts, hoses and the like. It is particularly favorably used as the rubber for tire tread.

The invention will be understood more readily with reference to the following examples; however, these examples are intended to illustrate the invention and are not to be construed to limit the scope of the invention.

In the examples, "part" and "%" mean "weight part" and "weight %" unless otherwise mentioned.

Various measurements were conducted according to the following methods.

The branched polymer bonded to tin was obtained by dissolving 1 g of the total polymer into 10 ml of toluene, and, after being added with 0.2 ml of concentrated hydrochloric acid and stirred for 20 minutes, purified by precipitation in methanol. This treatment is based on the principle that the part coupled with tin in the polymer is cleaved by the treatment with hydrochloric acid.

Number average molecular weight (Mn) of the polymer was measured by gel permeation chromatography (G. P. C.) by using the differential refractive index (RI) and the absorption of ultraviolet light of 254 nm (U. V.) and was obtained by conversion to polystyrene by using the monodispersed polystyrene as the standard.

The molecular weight of polybutadiene containing the chain having the tin-carbon linkage shown in Table 5 was calculated from G. P. C data obtained by using the U. V. detector of G. P. C. based on the strong U. V. absorption property derived from the structure of the bonded part of tin and the polymer.

The content of the polymer containing the chain having the tin-carbon linkage shown in Table 5 was obtained by comparing the area of the part corresponding to the polymer coupled with tin obtained as described above with the total area in the G. P. C. data obtained by using the R. I. detector of G. P. C. For butadiene-styrene copolymers, the content was obtained by the measurement using the RI detector assuming the same condition as for polybutadiene.

The results of measurement of G. P. C. of the polymer in Table 7 showed that a high molecular weight polymer component and a low molecular weight component were included. The ratio of the contents of the two polymer components was obtained from the ratio of the peaks obtained by using the RI detector of G. P. C.

It is known that the polybutadiene containing the chain having the tin-carbon linkage has a strong UV absorption derived from the structure of the part of the tin-polymer linkage and the polymer containing no tin-carbon linkage shows almost no UV absorption. By making use of this property, the structure of the polymer of the invention was analyzed by the UV detector of G. P. C., and it was found that the high molecular weight polymer had the UV absorption described above while the low molecular weight polymer did not. Therefore, it was concluded that the high molecular weight polymer component is the polymer containing the chain having the tin-carbon linkage and the low molecular weight polymer component is the polymer containing no chain having the tin-carbon linkage.

In the case of a copolymer of butadiene and styrene, analysis by using the UV detector is not possible because the UV absorption of the styrene unit is too strong. However, because the condition can be considered to be similar to that of polybutadiene, it is considered that the high molecular weight polymer component is the polymer containing the chain having the tin-carbon linkage and the low molecular weight polymer component is the polymer containing no chain having the tin-carbon linkage.

From the analysis described above, the number average molecular weights and the contents of the polymer were obtained with both the chain containing the chain having the tin-carbon linkage and the polymer containing the chain having no tin-carbon linkage.

Microstructure of polybutadiene or the butadiene part of the styrene-butadiene copolymer was obtained by the infrared method according to D. Morero, Chem. e. Ind., Vol. 41, Page 758 (1959). The content of styrene was obtained from the calibration line of the infrared method based on the absorption of the phenyl group at 699 cm$^{-1}$.

The active end can be measured by various methods. In the following examples, the active end was assumed to be 68 mol % of the organolithium initiator charged at the start of the polymerization. In the polymerization using an organolithium compound as the initiator, a part of the organolithium compound charged as the initiator is deactivated by impurities such as water, carbon dioxide and the like in the polymerization system in the ordinary polymerization even though sufficiently purified materials such as the solvent and the like are used. Generally, in the polymerization of a conjugated diene or a mixture of a conjugated diene and a vinylaromatic hydrocarbon using an organolithium compound as the initiator such as is the case in the present invention, it is well known that the molecular weight distribution is sufficiently narrow as shown by the number 1.1, and the number average molecular weight ($M_n$) of the polymer obtained by the polymerization can be theoretically calculated by the following equation 1:

Mn=(mol of the monomer/mol of the organolithium initiator)× molecular weight of the monomer     equation 1

It had been found that equation 1 holds approximately in the polymerization experiments of the invention, and the concentration of the organolithium initiator is assumed to follow equation 2 with correction by decrease of a certain fraction by impurities.

concentration of lithium at the active end of the polymer=mol of the organolithium compound charged at the start of the polymerization×fraction of the remaining organolithium compound     equation 2

It is apparent that the relations assumed in the equations hold when the same reactor and the solvent and the monomers taken from the same lots are used for the polymerization. Furthermore, this equation has been used industrially and empirically and has been proved to be objectively valid. Before conducting the series of the experiments for this invention, preliminary experiments were conducted, and the ratio of the remaining organolithium to the originally charged organolithium was obtained as 68%. Thus, the concentration of the lithium at the active end of the polymer was set at 68% of mol of the organolithium compound originally charged as the polymerization initiator.

As the index of the hysteresis loss and the rolling resistance, tan δ was used. When tan δ is smaller, the hysteresis loss and the rolling resistance were evaluated as lower. The measurement of tan δ was conducted by using an apparatus for measurement of viscoelasticity (a product of Rheometrix Co.) at a temperature of 50° C., a strain of 1% and a frequency of 15 Hz. The tensile properties were measured according to Japanese Industrial Standard K6301. The Mooney viscosity ($ML_{1+4}$) was measure by using the L rotor at 100° C. according to the general method.

As the index of the wear resistance, pico abrasion was used. The pico abrasion was measured by using a Goodrich pico abrasion tester at room temperature according to ASTM D-2228.

Wet skid resistance was measured with a vulcanized test piece of the rubber composition of the invention by using a wet skid tester (a product of Stanley Co., England) at 25° C. on a wet asphalt road surface.

EXAMPLE 1

Into a 5 liter reactor equipped with a stirrer, 1500 g of cyclohexane, 200 g of 1,3-butadiene, 50 g of styrene and 0.80 g of tetrahydrofuran were charged. After the temperature inside of the reactor was adjusted to 60° C., 0.14 g of n-butyllithium was added to start the polymerization.

Immediately after the start of the polymerization by charging n-butyllithium, 0.49 g of tetraallyltin (a product of Aldrich Chemical Co.) was added. After the addition, the polymerization was continued at 60° C. for 60 more minutes, and then the polymerization was terminated by isopropyl alcohol.

Then, after adding 2.5 g of 2,6-di-tort-butyl-p-cresol to the solution containing the polymer, the solvent was removed by steam-stripping, and the solid product obtained was dried by rolls heated to 100° C. to obtain a rubbery polymer. The properties of the polymer are shown in Table 1.

The polymer was compounded with other components according to the formulation shown in Table 3 by a 250 ml laboratory plastomill and 3 inch rolls and then vulcanized at 145° C. for 35 minutes. The properties of the vulcanizate are shown in Table 2.

EXAMPLES 2 and 3

Polymerization was conducted by the same method as in Example 1 except that 0.85 g of tetrabenzyltin was added in Example 2 and 0.74 g of tetraphenyltin (a product of Aldrich Chemical Co.) was added in Example 3. Tetrabenzyltin was obtained by the reaction of tin tetrachloride with benzylmagnesium chloride (a product of Aldrich Chemical Co.) in diethyl ether and used after distillation under reduced pressure (mp=42°–43° C.). The properties of the polymers and properties of the vulcanizates from the polymers are shown in Table 1 and Table 2, respectively.

EXAMPLE 4

In a hydrocarbon solvent, 30.9 g of styrene was polymerized by using 1.0 g of n-butyllithium as the initiator to obtain polystyrene of molecular weight of 2000 having styryllithium polymer end. Then, by the coupling reaction with 1.01 g of tin tetrachloride, tetrapolystyryltin (the structure of the bonded part of the polystyrene chain and tin is the benzyl structure) was obtained. After the polymer thus obtained was purified and dried sufficiently, 14.02 g of the polymer was dissolved in 100 ml of benzene. The polymerization was conducted by the same method as in Example 1 except that the solution prepared above was added immediately after the start of the polymerization. The properties of the polymer and the properties of the vulcanizate from the polymer are shown in Table 1 and Table 2, respectively.

EXAMPLE 5

In a hydrocarbon solvent, 84.4 g of butadiene was polymerized by using 0.5 g of n-butyllithium as the initiator to obtain a polybutadiene of molecular weight of about 10000 having the butadienyllithium polymer end. Then, by the coupling reaction with 0.51 g of tin tetrachloride, tetrapolybutadienyltin (the structure of the bonded part of the polybutadiene chain and tin is the allyl structure) was obtained. After the polymer thus obtained was purified and dried sufficiently, 75.34 g of the polymer was dissolved in 400 ml of cyclohexane. The polymerization was conducted by the same method as in Example 1 except that the solution prepared above was added immediately after the start of the polymerization. The properties of the polymer and the properties of the vulcanizate from the polymer are shown in Table 1 and Table 2, respectively.

Comparative Example 1

Polymerization was conducted by the same method as in Example 1 except that no orgnotin compound was added. The properties of the polymer and the properties of the vulcanizate from the polymer are shown in Table 1 and Table 2, respectively.

Comparative Examples 2 to 4

Polymerization was conducted by the same method as in Example 1 except that 0.55 g of diallyldibutyltin in Comparative Example 2, 0.58 g of allyltributyltin (a product of Aldrich Chemical Co.) in Comparative Example 3 and 0.60 g of tetrabutyltin (a product of Aldrich Chemical Co.) Comparative Example 3 were added respectively. Diallyldibutyltin was obtained by the reaction of dibutyltin chloride with allylmagnesium bromide (a product of Aldrich Chemical Co.) in diethyl ether and used after distillation under reduced pressure (bp 93° C./0.1 mmHg). The properties of the polymers and properties of the vulcanizates are shown in Table I and Table 2, respectively.

TABLE 1

| | organotin compound | | properties of polymer | | | | | |
|---|---|---|---|---|---|---|---|---|
| | compound | mol equivalent ratio of Sn/Li | content of polymer contg. chain having Sn—C bond | molecular weight $M_n$ total polymer ($\times 10^4$) | molecular weight $M_n$ branched polymer bonded to tin ($\times 10^4$) | $ML_{1+4}$ (100° C.) | vinyl content in butadiene part (%) | styrene content (%) |
| Example 1 | tetraallyltin | 1.16 | considerable amount | 23 | 11 | 39 | 42 | 20 |
| Example 2 | tetrabenzyltin | 1.18 | considerable amount | 23 | 11 | 41 | 42 | 20 |
| Example 3 | tetraphenyltin | 1.16 | considerable amount | 23 | 11 | 40 | 42 | 20 |
| Example 4 | tetrapolystyryltin (mol. wt. of the total styrene part $8 \times 10^3$) | 1.18 | considerable amount | 24 | 12 | 42 | 41 | 20 |
| Example 5 | tetrapolybutadienyltin (mol. wt. of the total butadiene part $43 \times 10^3$) | 1.26 | considerable amount | 24 | 12 | 42 | 41 | 20 |
| Comparative Example 1 | none | 0 | 0 | 17 | none | 43 | 41 | 20 |
| Comparative Example 2 | diallyldibutyltin | 1.17 | 0 | 18 | none | 43 | 41 | 20 |
| Comparative Example 3 | allyltributyltin | 1.18 | 0 | 18 | none | 42 | 41 | 20 |
| Comparative Example 4 | tetrabutyltin | 1.16 | 0 | 18 | none | 42 | 41 | 20 |

TABLE 2

| | organotin compound compound | properties of vulcanizate elongation (%) | properties of vulcanizate tensile strength (kgf/cm$^2$) | properties of vulcanizate 1% tan δ (50° C.) |
|---|---|---|---|---|
| Example 1 | tetraallyltin | 400 | 229 | 0.114 |
| Example 2 | tetrabenzyltin | 390 | 219 | 0.113 |
| Example 3 | tetraphenyltin | 390 | 217 | 0.114 |
| Example 4 | tetrapolystyryltin (mol. wt. of the total styrene part $8 \times 10^3$) | 380 | 214 | 0.115 |
| Example 5 | tetrapolybuta- | 390 | 218 | 0.114 |

TABLE 2-continued

| | | properties of vulcanizate | | |
|---|---|---|---|---|
| | organotin compound compound | elonga- tion (%) | tensile strength (kgf/cm$^2$) | 1% tan δ (50° C.) |
| Comparative Example 1 | dienyltin (mol. wt. of the total butadiene part 43 × 10$^3$) none | 410 | 205 | 0.129 |
| Comparative Example 2 | diallyldibutyltin | 400 | 207 | 0.131 |
| Comparative Example 3 | allyltributyltin | 400 | 204 | 0.132 |
| Comparative Example 4 | tetrabutyltin | 400 | 203 | 0.130 |

TABLE 3

| polymer | 100 parts |
|---|---|
| HAF carbon black | 50 |
| stearic acid | 2 |
| spindle oil | 5 |
| antioxidant 6C*$^1$ | 1 |
| zinc oxide | 3 |
| accelerator DPG*$^2$ | 0.5 |
| accelerator DM*$^3$ | 1.0 |
| sulfur | 1.5 |

*$^1$N-(1,3-dimethylbutyl)-N'-phenyl-p-phenylenediamine
*$^2$diphenylguanidine
*$^3$dibenzothiazyl disulfide As shown in Table 1, the examples of the present invention shown above were conducted by adding an organotin compound as the coupling agent at the initial period of the butadiene-styrene copolymerization. Though the tin/lithium ratios were large, the polymerizations proceeded, and the polymers obtained were high molecular weight rubbery polymers having the styrene-butadiene random structure containing considerable amounts of high molecular weight polymer containing the chain having the tin-carbon linkage. It is clear by comparison of the molecular weights of the total polymer and the branched polymer that considerable amounts of the polymer containing the chain having the tin-carbon linkage described above were contained. As comparisons with Comparative Examples show, the vulcanizates of these polymers exhibited good balances of the physical properties with small loss factors or small hysteresis without impairing the fracture properties.

As described above, even though the organotin compound was added at the initial period of the polymerization as a kind of coupling agent, the polymerization proceeded stoichiometrically in the same manner as the ordinary living polymerization to obtain the high molecular weight polymer containing the chain having the tin-carbon linkage. This clearly illustrates that the continuous polymerization was made possible.

. In Comparative Example 1, the coupling agent was not added and the vulcanizate obtained had a large loss factor or a large hysteresis loss and was inferior with respect to heat generation. In contrast, the hysteresis loss is low in the polymers containing the chain having the tin-carbon linkage shown in the Examples.

In Comparative Examples 2 to 4, organotin compounds having the structure obtained by replacing a part or the whole of the allyl groups of tetraallyltin with butyl group were added to the system. The polymers obtained did not contain any tin (as confirmed by U. V.), and the molecular weights before and after the treatment with hydrochloric acid did not change at all. Thus, these polymers did not contain the branched polymer which is bonded to tin. Therefore, with respect to the properties of the vulcanizates, the loss factor showed large values and the polymers were not preferable. These results are entirely the same as that in Comparative Example 1 in which no organotin compound was used and show that the organotin compounds examined here had no effect at all.

EXAMPLE 6

Into a 5 liter reactor equipped with a stirrer, 1500 g of cyclohexane, 250 g of 1,3-butadiene and 0.80 g of tetrahydrofuran were charged. After the temperature inside of the reactor was adjusted to 60° C., 0.140 g of n-butyllithium was added to start the polymerization.

After 5 minutes of the start of the polymerization by charging of n-butyllithium, 0.0795 g of tin tetrachloride (a product of Aldrich Chemical Co., a high purity product) was added. At this time, the polymerization of butadiene had already started, but almost no increase of viscosity of the polymerization solution was observed. A portion of polybutadiene formed at this time was taken out, and after termination of the polymerization by addition of isopropyl alcohol, conversion of the polymerization and molecular weight of the polymer were measured. The conversion was about 10%, and the number average molecular weight was $1.8 \times 10^4$. After the addition of tin tetrachloride, the polymerization was continued at 60° C. for 120 more minutes, and the polymerization was terminated with isopropyl alcohol.

Then, after adding 2.5 g of 2,6-di-tert-butyl-p-cresol to the solution containing the polymer, the solvent was removed by steam-stripping, and the solid product obtained was dried by rolls heated to 100° C. to obtain a rubbery polymer. The properties of the polymer, such as the number average molecular weights ($M_n$) of the total polymer obtained and the polymer containing the chain having the tin-carbon bond and the content of the polymer containing the chain having the tin-carbon bond in the total polymer, are shown in Table 4.

The polymer was compounded with other components according to the formulation shown in Table 3 by a 250 ml laboratory plastomill and 3 inch rolls and then vulcanized at 145° C. for 35 minutes. The properties of the vulcanizate are shown in Table 5.

EXAMPLES 7 and 8

Polymerization was conducted by the same method as in Example 6 except that the amount of addition of tin tetrachloride was changed to 0.0710 g and 0.083 g in Examples 7 and 8, respectively. The properties of the polymers obtained and the properties of the vulcanizates from the polymers are shown in Table 4 and Table 5, respectively.

Comparative Example 5

Polymerization was conducted by the same method as in Example 6 except that tin tetrachloride was not added. The properties of the polymer obtained and the properties of the vulcanizate from the polymer are shown in Table 4 and Table 5, respectively.

Comparative Examples 6 and 7

Polymerization was conducted by the same method as in Example 6 except that the amount of addition of tin tetrachloride was changed to 0.0602g in Comparative Example 6 and to 0.0503 g in Comparative Example 7. The properties of the polymers obtained and the properties of the vulcanizate from the polymer are shown in Table 4 and Table 5, respectively.

EXAMPLE 9

Into a 5 liter reactor equipped with a stirrer, 1500 g of cyclohexane, 200 g of 1,3-butadiene, 50 g of styrene and 0.80 g of tetrahydrofuran were charged. After the temperature inside of the reactor was adjusted to 60° C., 0.140 g of n-butyllithium was added to start the polymerization.

After 10 minutes of the start of the polymerization by charging of n-butyllithium (the conversion of the polymerization, about 20%), 0.0951 g of tin tetrachloride was added. After the addition, the polymerization was continued at 60° C. for 120 more minutes, and the polymerization was terminated with isopropyl alcohol.

Then, after adding 2.5 g of 2,6-di-tert-butyl-p-cresol to the solution containing the polymer, the solvent was removed by steam-stripping, and the solid product obtained was dried by rolls heated to 100° C. to obtain a rubbery polymer. The properties of the polymer are shown in Table 4. The polymer containing the chain having the tin-carbon linkage had a high molecular weight like the polybutadiene of the invention, and the content of the polymer was high.

The polymer was compounded with other components according to the formulation shown in Table 3 by a 250 ml laboratory plastomill and 3 inch rolls and then vulcanized at 145° C. for 35 minutes. The properties of the vulcanizate are shown in Table 5.

EXAMPLES 10 to 13

Polymerization was conducted by the same method as in Example 9 except that 0.0879 g, 0.0795 g and 0.0716 g of tin tetrachloride were added in Examples 10, 11 and 12, respectively, and 0.134 g of tin tetrabromide was added in Example 13. The properties of the polymers and the properties of the vulcanizates from the polymers are shown in Table 4 and Table 5, respectively.

EXAMPLE 14

Polymerization was conducted by the same method as in Example 9 except that, immediately after the start of the polymerization (the conversion of the polymerization, several %; the amount of the lithium at the active end of the polymer, 0.595 mmol/100 g monomer; A), 0.0762 g (0.117 mmol/100 g monomer; B, B/A=0.197) of tin tetrachloride was added. When the conversion of the polymerization reached about 100%, a specified amount of tributyltin chloride was added until the color of the polymerization solution disappeared. The number average molecular weight of the total polymer obtained was $46 \times 10^4$, the vinyl content of the butadiene part was 41% and the styrene content was 20%. The vulcanizate of the polymer had elongation of 400%, tensile strength of 258 kgf/cm$^2$ and 1% tan δ (50° C.) of 0.083.

Comparative Example 8

Polymerization was conducted by the same method as in Example 9 except that tin tetrachloride was not added. The properties of the polymer and the properties of the vulcanizate from the polymer are shown in Table 4 and Table 5, respectively.

Comparative Example 9

Polymerization was conducted by the same method as in Example 9 except that 0.1035 g of tin tetrachloride was added. The polymerization was deactivated immediately after the addition of tin tetrachloride, and no polymer was obtained. Consequently, physical properties could not be measured.

TABLE 4

| | amount of Li at the polymer end (A) (mmol/100 g monomer) | SnX$_4$ compound | SnX$_4$ added amount (B) (mmol/100 g monomer) | (B)/(A) | properties of polymer | | | | |
|---|---|---|---|---|---|---|---|---|---|
| | | | | | molecular weight M$_n$ | | content of polymer contg. chain having Sn—C bond (%) | vinyl content in butadiene part (%) | styrene content (%) |
| | | | | | total polymer (× 10$^4$) | total polymer contg. chain having Sn—C bond (× 10$^4$) | | | |
| Example 6 | 0.595 | SnCl$_4$ | 0.122 | 0.205 | 48 | 54 | >55 | 44 | 0 |
| Example 7 | 0.595 | SnCl$_4$ | 0.109 | 0.183 | 40 | 48 | 55 | 44 | 0 |
| Example 8 | 0.595 | SnCl$_4$ | 0.127 | 0.213 | 50 | 55 | >55 | 44 | 0 |
| Example 9 | 0.595 | SnCl$_4$ | 0.146 | 0.245 | 43 | — | >55 | 40 | 20 |
| Example 10 | 0.595 | SnCl$_4$ | 0.135 | 0.227 | 46 | — | >55 | 41 | 20 |
| Example 11 | 0.595 | SnCl$_4$ | 0.122 | 0.205 | 47 | — | >55 | 42 | 20 |
| Example 12 | 0.595 | SnCl$_4$ | 0.110 | 0.185 | 39 | — | 55 | 42 | 20 |
| Example 13 | 0.595 | SnBr$_4$ | 0.122 | 0.205 | 48 | — | >55 | 42 | 20 |
| Comparative Example 5 | 0.595 | none | none | 0 | 17 | none | 0 | 43 | 0 |
| Comparative Example 6 | 0.595 | SnCl$_4$ | 0.0924 | 0.155 | 34 | 47 | 40 | 44 | 0 |
| Comparative Example 7 | 0.595 | SnCl$_4$ | 0.0772 | 0.130 | 27 | 43 | 35 | 43 | 0 |
| Comparative Example 8 | 0.595 | none | none | 0 | 17 | none | 0 | 40 | 20 |
| Comparative Example 9 | 0.595 | SnCl$_4$ | 0.159 | 0.267 | no polymerization after addition of SnCl$_4$ | | | | |

TABLE 5

| | kind of SnX₄ | (B)/(A) | properties of vulcanizate | | |
|---|---|---|---|---|---|
| | | | elongation (%) | tensile strength (kgf/cm²) | 1% tan δ (50° C.) |
| Example 6 | SnCl₄ | 0.205 | 375 | 183 | 0.083 |
| Example 7 | SnCl₄ | 0.183 | 375 | 179 | 0.087 |
| Example 8 | SnCl₄ | 0.213 | 370 | 180 | 0.082 |
| Example 9 | SnCl₄ | 0.245 | 380 | 240 | 0.089 |
| Example 10 | SnCl₄ | 0.227 | 390 | 248 | 0.089 |
| Example 11 | SnCl₄ | 0.205 | 400 | 256 | 0.092 |
| Example 12 | SnCl₄ | 0.185 | 370 | 238 | 0.095 |
| Example 13 | SnBr₄ | 0.205 | 390 | 252 | 0.093 |
| Comparative Example 5 | none | 0 | 340 | 154 | 0.115 |
| Comparative Example 6 | SnCl₄ | 0.155 | 370 | 165 | 0.096 |
| Comparative Example 7 | SnCl₄ | 0.130 | 360 | 162 | 0.102 |
| Comparative Example 8 | none | 0 | 370 | 205 | 0.127 |
| Comparative Example 9 | SnCl₄ | 0.267 | no polymerization after addition of SnCl₄ | | |

As shown in Table 4 and 5, polymerizations were conducted by adding less than 0.25 mol equivalent of an SnX₄ compound based on 1 mol equivalent of the lithium at the active end of the polymer [(B)/(A) in Table 4] as the coupling agent at the initial period of the butadiene polymerization or the butadiene-styrene copolymerization. The polymers were high molecular weight rubbery polymers containing 50 weight % or more of the high molecular weight polymer containing the chain having the tin-carbon linkage as shown in Examples 6 to 8. As comparison of Examples 6 to 8 with Comparative Examples 5 to 7 in the case of the polybutadiene and comparison of Examples 9 to 13 with Comparative Example 8 in the case of the butadiene-styrene copolymer show, the vulcanizates of the polymers of the Examples exhibited good balances of the physical properties with good fracture properties and small tan δ values at 50° C.

As shown in Example 14, the effect described above is further enhanced by adding tributyltin chloride after finishing the polymerization and terminating with tin the polymer ends which are not bonded to tin.

As described above, even though a considerable amount of the coupling agent was added at the initial period of the polymerization, the polymerization proceeded stoichiometrically in the same manner as the ordinary living polymerization to obtain the useful high molecular weight polymer containing the chain having the tin-carbon linkage. This is a phenomenon which has not been known thus far and clearly shows that the continuous polymerization is made possible.

In Comparative Examples 5 and 8, tin tetrachloride (the coupling agent) was not added and the vulcanizates obtained had inferior fracture properties and large loss factors and were not preferable with respect to the heat generation. In contrast, hysteresis loss is low in the polymers containing the chain having the tin-carbon linkage shown in the Examples.

In Comparative Examples 6 and 7, less than 0.18 mol equivalent of tin tetrachloride based on 1 mol equivalent of the lithium at the active end of the polymer was added. The polymers obtained had low contents of the polymer containing the chain having the tin-carbon linkage and low number average molecular weights. The vulcanizates obtained had inferior fracture properties and large loss factors and were not preferable with respect to heat generation.

In Comparative Example 9, more than 0.25 mol equivalent of tin tetrachloride based on i molequivalent of the lithium at the active end of the polymer was added. All of the lithium at the active end of the polymer was deactivated, and no polymerization occurred after the addition of the tin compound.

EXAMPLE 15

Into a 5 liter reactor equipped with a stirrer, 1500 g of cyclohexane, 250 g of 1,3-butadiene and 0.65 g of tetrahydrofuran were charged. After the temperature inside of the reactor was adjusted to 60° C., 0.115 g of n-butyllithium was added to start the polymerization.

After 5 minutes of the start of the polymerization by charging of n-butyllithium, 0.0995 g of tin dichloride was added. At this time, the polymerization of butadiene had already started, but almost no increase of viscosity of the polymerization solution was observed. A portion of polybutadiene formed at this time was taken out, and after termination of the polymerization by addition of isopropyl alcohol, conversion of the polymerization and molecular weight of the polymer were measured. The conversion was about 10%, and the number average molecular weight was $1.8 \times 10^4$. After the addition of tin dichloride, the polymerization was continued at 60° C. for 120 more minutes, and the polymerization was terminated with isopropyl alcohol.

Then, after adding 2.5 g of 2,6-di-tert-butyl-p-cresol to the solution containing the polymer, the solvent was removed by steam-stripping, and the solid product obtained was dried by rolls heated to 100° C. to obtain a rubbery polymer. The properties of the polymer, such as the number average molecular weights ($M_n$) of the total polymer obtained, the polymer containing no chain having the tin-carbon linkage and the polymer containing the chain having the tin-carbon linkage contained in the total polymer and the content of the polymer containing the chain having the tin-carbn bond in the total polymer, are shown in Table 6.

The polymer was compounded with other components according to the formulation shown in Table 3 by a 250 ml laboratory plastomill and 3 inch rolls and then vulcanized at 145° C. for 35 minutes. The properties of the vulcanizate are shown in Table 7.

EXAMPLES 16 to 18

Polymerization was conducted by the same method as in Example 15 except that the amount of addition of tin dichloride was changed to 0.0806 g, 0.0569 g and 0.0332 g in Examples 16, 17 and 18, respectively. The properties of the polymers obtained and the properties of the vulcanizates from the polymers are shown in Table 6 and Table 7, respectively.

Comparative Example 10

Polymerization was conducted by the same method as in Example 15 except that tin dichloride was not added. The properties of the polymer obtained and the properties of the vulcanizate from the polymer are shown in Table 6 and Table 7, respectively.

EXAMPLE 19

Into a 5 liter reactor equipped with a stirrer, 1500 g of cyclohexane, 200 g of 1,3-butadiene, 50 g of styrene and 0.65 g of tetrahydrofuran were charged. After the temperature inside of the reactor was adjusted to 60° C., 0.115 g of n-butyllithium was added to start the polymerization.

After 10 minutes of the start of the polymerization by charging of n-butyllithium (the conversion of the polymerization, about 20%), 0.0995 g of tin dichloride was added. After the addition, the polymerization was continued at 60° C. for 120 more minutes, and the polymerization was terminated with isopropyl alcohol.

Then, after adding 2.5 g of 2,6-di-tert-butyl-p-cresol to the solution containing the polymer, the solvent was removed by steam-stripping, and the solid product obtained was dried by rolls heated to 100° C. to obtain a rubbery polymer. The properties of the polymer are shown in Table 6. The polymer containing the chain having the tin-carbon linkage had a high molecular weight like the polybutadiene of the invention, and the content of the polymer was high.

The polymer was compounded with other components according to the formulation shown in Table 3 by a 250 ml laboratory plastomill and 3 inch rolls and then vulcanized at 145° C. for 35 minutes. The properties of the vulcanizate are shown in Table 7.

EXAMPLES 20 to 23

Polymerization was conducted by the same method as in Example 19 except that 0.0900 g, 0.0569 g and 0.0284 g of tin dichloride were added in Examples 20, 21 and 22, respectively, and 0.0839 g of tin dibromide was added in Example 23. The properties of the polymers and the properties of the vulcanizates from the polymers are shown in Table 6 and Table 7, respectively.

EXAMPLE 24

Polymerization was conducted by the same method as in Example 19 except that, immediately after the start of the polymerization (the conversion, several %; the amount of the lithium at the active end of the polymer, 0.49 mmol/100 g monomer; A), 0.0900 g (0.19 mmol/100 g monomer; B, B/A=0.39) of tin dichloride was added. When the conversion of the polymerization reached about 100%, a specified amount of tributyltin chloride was added until the color of the polymerization solution disappeared. The number average molecular weight of the polymer obtained was $48 \times 10^4$, the vinyl content of the butadiene part was 41% and the styrene content was 20%. The vulcanizate of the polymer had elongation of 390%, tensile strength of 262 kgf/cm$^2$ and 1% tan δ (50° C.) of 0.091.

Comparative Example 11

Polymerization was conducted by the same method as in Example 19 except that tin dichloride was not added. The properties of the polymer and the properties of the vulcanizate from the polymer are shown in Table 6 and Table 7, respectively.

Comparative Example 12

Polymerization was conducted by the same method as in Example 19 except that 0.1184 g of tin dichloride was added. The polymerization was deactivated immediately after the addition of tin dichloride, and no polymer was obtained. Consequently, physical properties could not be measured.

TABLE 6

| | amount of Li at the polymer end (A) (mmol/100 g monomer) | SnX$_2$ compound | SnX$_2$ added amount (B) (mmol/100 g monomer) | (B)/(A) | molecular weight M$_n$ polymer contg. no chain having Sn—C bond ($\times 10^4$) | molecular weight M$_n$ polymer contg. chain having Sn—C bond ($\times 10^4$) | content of polymer contg. chain having Sn—C bond (%) | vinyl content in butadiene part (%) | styrene content (%) |
|---|---|---|---|---|---|---|---|---|---|
| Example 15 | 0.49 | SnCl$_2$ | 0.21 | 0.43 | 19 | 50 | 80 | 40 | 0 |
| Example 16 | 0.49 | SnCl$_2$ | 0.17 | 0.35 | 20 | 52 | 80 | 41 | 0 |
| Example 17 | 0.49 | SnCl$_2$ | 0.12 | 0.24 | 20 | 52 | 65 | 41 | 0 |
| Example 18 | 0.49 | SnCl$_2$ | 0.07 | 0.14 | 19 | 53 | 42 | 41 | 0 |
| Example 19 | 0.49 | SnCl$_2$ | 0.21 | 0.43 | 19 | 51 | 80 | 40 | 20 |
| Example 20 | 0.49 | SnCl$_2$ | 0.19 | 0.39 | 20 | 52 | 80 | 41 | 21 |
| Example 21 | 0.49 | SnCl$_2$ | 0.12 | 0.24 | 20 | 52 | 65 | 41 | 20 |
| Example 22 | 0.49 | SnCl$_2$ | 0.06 | 0.12 | 19 | 52 | 40 | 31 | 20 |
| Example 23 | 0.49 | SnBr$_2$ | 0.12 | 0.24 | 20 | 51 | 65 | 41 | 21 |
| Comparative Example 10 | 0.49 | none | — | 0 | 20 | none | 0 | 40 | 0 |
| Comparative Example 11 | 0.49 | none | — | 0 | 20 | none | 0 | 40 | 21 |
| Comparative Example 12 | 0.49 | SnCl$_2$ | 0.25 | 0.51 | no polymerization after addition of SnCl$_2$ | | | | |

TABLE 7

| | kind of SnX$_2$ | (B)/(A) | elongation (%) | tensile strength (kgf/cm$^2$) | 1% tan δ (50° C.) |
|---|---|---|---|---|---|
| Example 15 | SnCl$_2$ | 0.43 | 375 | 182 | 0.086 |
| Example 16 | SnCl$_2$ | 0.35 | 370 | 177 | 0.087 |
| Example 17 | SnCl$_2$ | 0.24 | 365 | 173 | 0.091 |
| Example 18 | SnCl$_2$ | 0.14 | 365 | 170 | 0.095 |
| Example 19 | SnCl$_2$ | 0.43 | 392 | 263 | 0.092 |
| Example 20 | SnCl$_2$ | 0.39 | 385 | 256 | 0.093 |
| Example 21 | SnCl$_2$ | 0.24 | 380 | 240 | 0.098 |
| Example 22 | SnCl$_2$ | 0.12 | 376 | 228 | 0.109 |
| Example 23 | SnBr$_2$ | 0.24 | 382 | 238 | 0.097 |

TABLE 7-continued

| | | | properties of vulcanizate | | |
|---|---|---|---|---|---|
| | kind of SnX$_2$ | (B)/(A) | elongation (%) | tensile strength (kgf/cm$^2$) | 1% tan δ (50° C.) |
| Comparative Example 10 | none | 0 | 350 | 162 | 0.102 |
| Comparative Example 11 | none | 0 | 365 | 210 | 0.125 |
| Comparative Example 12 | SnCl$_2$ | 0.51 | no polymerization after addition of SnCl$_2$ | | |

As shown in Tables 6 and 7, polymerizations were conducted by adding less than 0.5 mol equivalent of an SnX$_2$ compound based on 1 mol equivalent of the lithium at the active end of the polymer [(B)/(A) in Table 6] as the coupling agent at the initial period of the butadiene polymerization or the butadiene-styrene copolymerization. The obtained polymers comprised 40 weight % or more of the high molecular weight polymer containing the chain having the tin-carbon linkage and low molecular weight polymer containing no chain having the tin-carbon linkage as shown in Examples 15 to 18. As comparison of Examples 15 to 18 with Comparative Example 10 in the case of the polybutadiene and comparison of Examples 19 to 23 with Comparative Example 11 in the case of the butadiene-styrene copolymer show, the vulcanizates of these polymers in the Examples showed good balances of the physical properties with good fracture properties and small tan δ values at 50° C.

As shown in Example 24, the effect described above is further enhanced by adding tributyltin chloride after finishing the polymerization and terminating with tin the polymer ends which are not bonded to tin.

As described above, even though a considerable amount of the coupling agent was added at the initial period of the polymerization, the polymerization proceeded stoichiometrically in the same manner as the ordinary living polymerization to obtain the high molecular weight polymer containing the chain having the tin-carbon linkage. This is a phenomenon which has not been known thus far and clearly shows that the continuous polymerization is made possible.

In Comparative Examples 10 and 11, tin dichloride (the coupling agent) was not added, and the vulcanizate obtained had inferior fracture properties and a large loss factor and is not preferable with respect to the heat generation. In contrast, hysteresis loss is low in the polymers containing the chain having the tin-carbon linkage shown in the Examples.

In Comparative Example 12, more than 0.5 mol equivalent of tin dichloride based on 1 mol equivalent of the lithium at the active end of the polymer was added. All of the lithium at the active end of the polymer was deactivated, and no polymerization occurred after the addition of the tin compound.

EXAMPLE 25

Into a 5 liter reactor equipped with a stirrer, 1500 g of cyclohexane, 200 g of 1,3-butadiene, 50 g of styrene and 0.36 g of tetrahydrofuran were charged. After the temperature inside of the reactor was adjusted to 60° C., 0.094 g of n-butyllithium was added to start the polymerization.

Immediately after the start of the polymerization by charging of n-butyllithium, 0.283 g of tetraallyltin was added. After the addition, the polymerization was continued at 60° C. for 90 more minutes, and the polymerization was terminated with isopropyl alcohol.

Then, after adding 2.5 g of 2,6-di-tert-butyl-p-cresol to the solution containing the polymer, the solvent was removed by steam-stripping, and the solid product obtained was dried by rolls heated to 100° C. to obtain a rubbery polymer A. The properties of polymer A are shown in Table 8.

Polymer A was compounded with other components according to the formulation shown in Table 9 by a 250 ml laboratory plastomill and 3 inch rolls. In the compounding, specified amounts of natural rubber and the polymer added with the tin compound were blended. The compounded rubber was vulcanized at 145° C. for 35 minutes. A tire using this compounded rubber as the tread rubber was prepared and performances of the tire were evaluated. The results are shown in Table 10.

EXAMPLES 26 and 27

Polymers B and C were prepared by the same method used to prepare polymer A except that 0.566 g of tetraallyltin was added for polymer B in Example 26 and 0.427 g of tetraphenyltin was added for polymer C in Example 27. Properties of the polymers were measured. Physical properties of the vulcanizates and performances of the tire were evaluated by the same methods as in Example 25. The results are shown in Table 8 and Table 10.

EXAMPLE 28

Polymer D was prepared by the same method used to prepare polymer A except that 0.355 g of diallyldiphenyltin was added and properties of the polymers were measured. Physical properties of the vulcanizates and performances of the tire were evaluated by the same methods as in Example 25. The results are shown in Table 8 and Table 10. Diallyldiphenyltin was obtained by the reaction of diphenyltin dichloride and allyl magnesium bromide in diethyl ether and used after distillation under reduced pressure (Bp 172°~174° C./5 mmHg).

Comparative Example 13

Polymer E was prepared by the same method used to prepare polymer A except that the polymerization was started by charging 0.117 g of n-butyllithium and 0.45 g of tetrahydrofuran, and then 0.392 g of diallyldibutyltin was added. Properties of the polymers were measured. Physical properties of the vulcanizates and performances of the tire were evaluated by the same methods as in Example 25. The results are shown in Table 8 and Table 10.

Comparative Example 14

Polymer F was prepared by the same method used to prepare polymer A except that the polymerization was started by charging 0.117 g of n-butyllithium and 0.45 g of tetrahydrofuran. No organotin compound was added. Properties of the polymers were measured. Physical properties of the vulcanizates and performances of the tire were evaluated by the same methods as in Example 25. The results are shown in Table 8 and Table 10.

EXAMPLE 29

Properties of the vulcanizate and performances of the tire were evaluated by the same method as in Example 25 except that 40 weight parts of polymer A and 60 weight parts of natural rubber were used for the compounding of the rubber materials. Results are shown in Table 10.

Comparative Example 15

Properties of the vulcanizate and performances of the tire were evaluated by the same method as in Example 25 except that 20 weight parts of polymer A and 80 weight parts of natural rubber were used for the compounding of the rubber materials. Results are shown in Table 10.

EXAMPLE 30

Polymer G having a relatively high molecular weight was prepared by the same method used to prepare polymer A except that the polymerization was started by charging 0.070 g of n-butyllithium and 0.36 g of tetrahydrofuran, and then 0.141 g of tetraallyltin was added. Properties of the polymers were measured. Physical properties of the vulcanizates and performances of the tire were evaluated by the same methods as in Example 25. The results are shown in Table 8 and Table 10.

Comparative Example 16

Polymer H having a high molecular weight was prepared by the same method used to prepare polymer A except that the polymerization was started by charging 0.054 g of n-butyllithium and 0.18 g of tetrahydrofuran, and then 0.072 g of tetraallyltin was added. Properties of the polymers were measured. Physical properties of the vulcanizates and performances of the tire were evaluated by the same methods as in Example 25. The results are shown in Table 8 and Table 10.

TABLE 9

| rubber material | 100 parts |
|---|---|
| NR[*1] | x |
| polymer added with tin | 100 − x |
| HAF carbon black | 45 |
| aromatic oil | 5 |
| stearic acid | 2 |
| antioxidant 6C[*2] | 1 |
| zinc oxide | 3 |
| accelerator DPG[*3] | 0.5 |
| accelerator DM[*4] | 1.0 |
| sulfur | 1.5 |

[*1]natural rubber
[*2]N-(1,3-dimethylbutyl)-N'-phenyl-p-phenylenediamine
[*3]diphenylguanidine
[*4]dibenzothiazyl disulfide

TABLE 8

| polymer | amount of Li at polymer end (X) (mmol/100 g monomer) | tin compound | added amount of tin compound (Y) (mmol/100 g monomer) | Y/X | styrene content (%) | vinyl content in butadiene part (%) | molecular weight Mn ($\times 10^4$) |
|---|---|---|---|---|---|---|---|
| A | 0.40 | tetraallyltin | 0.40 | 1.0 | 20 | 34 | 17 |
| B | 0.40 | tetraallyltin | 0.80 | 2.0 | 20 | 33 | 13 |
| C | 0.40 | tetraphenyltin | 0.40 | 1.0 | 20 | 33 | 17 |
| D | 0.40 | diallyldiphenyltin | 0.40 | 1.0 | 20 | 34 | 17 |
| E | 0.50 | diallyldibutyltin | 0.50 | 1.0 | 20 | 34 | 20 |
| F | 0.50 | none | — | — | 20 | 35 | 20 |
| G | 0.20 | tetraallyltin | 0.20 | 1.0 | 20 | 37 | 33 |
| H | 0.10 | tetraallyltin | 0.10 | 1.0 | 20 | 38 | 56 |

TABLE 10

| | polymer | amount of blending (NR/polymer added with tin) | tensile strength (kgf/cm$^2$) | elongation (%) | 1% tan δ (50° C.) | pico abrasion (index) | wet skid resistance (index) |
|---|---|---|---|---|---|---|---|
| | | | physical properties of vulcanizate | | | | performance of tire |
| Example 25 | A | 30/70 | 224 | 550 | 0.122 | 110 | 105 |
| Example 26 | B | 30/70 | 221 | 540 | 0.122 | 110 | 105 |
| Example 27 | C | 30/70 | 223 | 560 | 0.123 | 110 | 105 |
| Example 28 | D | 30/70 | 223 | 540 | 0.124 | 110 | 105 |

TABLE 10-continued

|  | polymer | amount of blending (NR/polymer added with tin) | physical properties of vulcanizate | | | | performance of tire |
|---|---|---|---|---|---|---|---|
|  |  |  | tensile strength (kgf/cm²) | elongation (%) | 1% tan δ (50° C.) | pico abrasion (index) | wet skid resistance (index) |
| Comparative Example 13 | E | 30/70 | 216 | 520 | 0.146 | 100 | 100 |
| Comparative Example 14 | F | 30/70 | 213 | 520 | 0.148 | 100 | 100 |
| Example 29 | A | 60/40 | 230 | 560 | 0.118 | 110 | 90 |
| Comparative Example 15 | A | 80/20 | 246 | 540 | 0.115 | 110 | 85 |
| Example 30 | G | 30/70 | 231 | 560 | 0.116 | 115 | 105 |
| Comparative Example 16 | H | 30/70 | 215 | 530 | 0.129 | 110 | 100 |

Pico abrasion and wet skid resistance were expressed as indices based on the value of Comparative Example 14. For both properties, a value higher than 100 shows a better value and a value lower than 100 shows an inferior value.

As shown in Table 10, the polymers prepared by using the organotin compound of the present invention (polymers A to D) are excellent with respect to all of the tensile strength, elongation, tan δ at 50° C., as well as pico abrasion of the rubber compositions prepared from these polymers and wet skid resistance of the tire prepared from these rubber compositions in comparison with the polymer in which a part of R of the organotin compound R$_4$Sn was replaced by two alkyl groups (polymer E) and with the polymer prepared by adding no organotin compound (polymer F). Therefore, a tire having good balance of low fuel cost, safety and the like can be obtained by using the rubber compositions of the Examples.

When the content of the polymer of the invention in 100 weight parts of the rubber material in Example 29 (40 weight parts) is compared with that of Comparative Example 15 (20 weight parts), the rubber composition of Example 29 of the invention showed a better value with regard to wet skid resistance than that of Comparative Example 15. Other properties are also better in Example 29, showing that the polymer of the present invention is excellent.

When the polymer in Example 30 having the number average molecular weight of 33×10$^4$ and the polymer in Comparative Example 16 having the higher number average molecular weight of 56×10$^4$ are compared, it is evident that the polymer in Example 30 is superior in all of the physical properties of the vulcanizate and the performances of the tire. On the other hand, the weight average molecular weights of the polymers in Example 30 and in Comparative Example 16 are 67×10$^4$ and 120×10$^4$, respectively, and these data show that the molecular weight distributions are wide. Therefore, it is necessary to take both the number average molecular weight and the weight average molecular weight into consideration. In any case, the above results show that there exists a preferable range of the molecular weight.

EXAMPLE 31

Into a 5 liter reactor equipped with a stirrer, 1500 g of cyclohexane, 200 g of 1,3-butadiene, 50 g of styrene and 1.071 g of tetrahydrofuran were charged. After the temperature inside of the reactor was adjusted to 60° C., 0,140 g of n-butyllithium was added to start the polymerization.

Immediately after the start of the polymerization by charging of n-butyllithium, 0.080 g of tin tetrachloride was added. After the addition, the polymerization was continued at 60° C. for 90 more minutes, and the polymerization was terminated with isopropyl alcohol.

Then, after adding 2.5 g of 2,6-di-tert-butyl-p-cresol to the solution containing the polymer, the solvent was removed by steam-stripping, and the solid product obtained was dried by rolls heated to 100° C. to obtain a rubbery polymer J. The properties of polymer J are shown in Table 11.

Polymer J was compounded with other components according to the formulation shown in Table 9 by a 250 ml laboratory plastomill and 3 inch rolls. In the compounding, specified amounts of natural rubber and the polymer added with the tin compound were blended. The compounded rubber was vulcanized at 145° C. for 35 minutes. A tire using this compounded rubber as the tread rubber was prepared and performances of the tire were evaluated. The results are shown in Table 12.

EXAMPLES 32 and 33

Polymers K and M were prepared by the same method used in Example 31 except that 0.072 g of tin tetrachloride was added for polymer K in Example 32 and 0.134 g of tin tetrabromide was added for polymer M in Example 33. Properties of the polymers were measured. Physical properties of the vulcanizates and performances of the tire were evaluated by the same methods as in Example 31. The results are shown in Table 11 and Table 12.

Example 34

Into a 5 liter reactor equipped with a stirrer, 1500 g of cyclohexane, 200 g of 1,3-butadiene, 50 g of styrene and 0.880 g of tetrahydrofuran were charged. After the temperature inside of the reactor was adjusted to 60° C., 0.115 g of n-butyllithium was added to start the polymerization.

Immediately after the start of the polymerization by charging of n-butyllithium, 0.090 g of tin dichloride was added. After the addition, the polymerization was continued at 60° C. for 90 more minutes, and the polymerization was terminated with isopropyl alcohol.

Then, after adding 2.5 g of 2,6-di-tert-butyl-p-cresol to the solution containing the polymer, the solvent was removed by steam-stripping, and the solid product obtained was dried by rolls heated to 100° C. to obtain a rubbery polymer N. The properties of polymer N are shown in Table 11.

Polymer N was compounded with other components according to the formulation shown in Table 9 by a 250 ml laboratory plastomill and 3 inch rolls. In the compounding, specified amounts of natural rubber and the polymer added with the tin compound were blended. The compounded rubber was vulcanized at 145° C. for 35 minutes. A tire using this compounded rubber as the tread rubber was prepared and performances of the tire were evaluated. The results are shown in Table 12.

EXAMPLE 35

Polymer Q was prepared by the same method used in Example 34 except that in stead of terminating the polymerization by isopropyl alcohol the specified amount of tributyltin chloride was added until the color of the polymer solution disappeared. Properties of the polymers were measured. Physical properties of the vulcanizates and performances of the tire were evaluated by the same methods as in Example 31. The results are shown in Table 11 and Table 12.

Comparative Example 17

Polymer L was prepared by the same method used in Example 31 except that 0.060 g of tin tetrachloride was added. Properties of the polymers were measured. Physical properties of the vulcanizates and performances of the tire were evaluated by the same methods as in Example 31. The results are shown in Table 11 and Table 12.

Comparative Example 18

Polymer P was prepared by the same method used in Example 34 except that 0.024 g of tin dichloride was added. Properties of the polymers were measured. Physical properties of the vulcanizates and performances of the tire were evaluated by the same methods as in Example 31. The results are shown in Tables 11 and 12.

Comparative Examples 19 and 20

Polymer S (high molecular weight) and polymer T (low molecular weight) were prepared by the same method used in Example 34 except that 0.268 g of tetrahydrofuran, 0.068 g of butyllithium and 0.027 g of tin dichloride were added for polymer S in Comparative Example 19 and that 3.705 g of tetrahydrofuran, 0.370 g of n-butyllithium and 0.372 g of tin dichloride were added for polymer T in Comparative Example 20. Properties of the polymers were measured. Physical properties of the vulcanizates and performances of the tire were evaluated by the same methods as in Example 31. The results are shown in Tables 11 and 12. The concentrations of the lithium at the active end of the polymer were assumed to be 35% and 89% based on the mol of the organolithium initiator charged at the beginning of the polymerization in Comparative Example 19 and Comparative Example 20, respectively.

Comparative Example 21

Polymer U was prepared by the same method used in Example 34 except that tin dichloride was not added. Properties of the polymer were evaluated. Physical properties of the vulcanizates and performances of the tire were evaluated by the same methods as in Example 31. The results are shown in Table 11 and Table 12.

EXAMPLE 36

Properties of the vulcanizate and performances of the tire were evaluated by the same method as in Example 34 except that 40 weight parts of polymer N and 60 weight parts of natural rubber were used for the compounding of the rubber materials. Results are shown in Table 12.

Comparative Example 22

Properties of the vulcanizate and performances of the tire were evaluated by the same method as in Example 34 except that 20 weight parts of polymer N and 80 weight parts of natural rubber were used for the compounding of the rubber materials. Results are shown in Table 12.

TABLE 11

| polymer | amount of Li at polymer end (X) (mmol/100 g monomer) | halogenated tin compound | added amount of tin compound (Y) (mmol/100 g monomer) | Y/X | styrene content (%) | vinyl content in butadiene part (%) | molecular weight Mn (× 10$^4$) |
| --- | --- | --- | --- | --- | --- | --- | --- |
| J | 0.595 | SnCl$_4$ | 0.122 | 0.205 | 20 | 42 | 29 |
| K | 0.595 | SnCl$_4$ | 0.110 | 0.185 | 20 | 42 | 25 |
| L | 0.595 | SnCl$_4$ | 0.092 | 0.155 | 20 | 42 | 24 |
| M | 0.595 | SnBr$_4$ | 0.122 | 0.205 | 20 | 42 | 28 |
| N | 0.490 | SnCl$_2$ | 0.190 | 0.390 | 20 | 42 | 41 |
| P | 0.490 | SnCl$_2$ | 0.050 | 0.100 | 20 | 42 | 25 |
| Q | 0.490 | SnCl$_2$ | 0.190 | 0.390 | 20 | 42 | 39 |
| S | 0.150 | SnCl$_2$ | 0.057 | 0.380 | 20 | 42 | 110 |
| T | 2.060 | SnCl$_2$ | 0.783 | 0.380 | 20 | 41 | 9 |
| U | 0.490 | none | — | — | 20 | 40 | 20 |

TABLE 12

| | polymer | amount of blending (NR/polymer added with tin) | physical properties of vulcanizate | | | | performance of tire |
|---|---|---|---|---|---|---|---|
| | | | tensile strength (kgf/cm$^2$) | elongation (%) | 1% tan δ (50° C.) | pico abrasion (index) | wet skid resistance (index) |
| Example 31 | J | 30/70 | 231 | 540 | 0.120 | 110 | 110 |
| Example 32 | K | 30/70 | 225 | 530 | 0.125 | 110 | 110 |
| Example 33 | M | 30/70 | 228 | 540 | 0.121 | 110 | 110 |
| Example 34 | N | 30/70 | 227 | 550 | 0.120 | 110 | 110 |
| Example 35 | Q | 30/70 | 229 | 530 | 0.117 | 115 | 110 |
| Comparative Example 17 | L | 30/70 | 218 | 540 | 0.129 | 100 | 110 |
| Comparative Example 18 | P | 30/70 | 215 | 550 | 0.136 | 100 | 110 |
| Comparative Example 19 | S | 30/70 | 220 | 520 | 0.141 | 95 | 105 |
| Comparative Example 20 | T | 30/70 | 187 | 520 | 0.175 | 80 | 90 |
| Comparative Example 21 | U | 30/70 | 213 | 520 | 0.148 | 100 | 100 |
| Example 36 | N | 60/40 | 232 | 560 | 0.118 | 110 | 95 |
| Comparative Example 22 | N | 80/20 | 239 | 550 | 0.116 | 110 | 85 |

Pico abrasion and wet skid resistance were expressed as indices based on the value of Comparative Example 21. For both properties, a value higher than 100 shows a better value and a value lower than 100 shows an inferior value.

As shown in Table 12, the polymers prepared by using the halogenated tin compound of the invention (polymers J, K, M and N) are excellent with respect to all of the tensile strength, elongation, tan δ at 50° C., as well as pico abrasion of the rubber compositions prepared from these polymers and wet skid resistance of the tire prepared from these rubber compositions in comparison with the polymer prepared by adding no halogenated tin compound (polymer U). Therefore, a tire having good balance of low fuel cost, safety and the like can be obtained by using the rubber compositions of these Examples.

The polymer prepared by adding the tin compound after the polymerization (polymer Q) showed particularly excellent tan δ at 50° C. and pico abrasion. Like the polymers in other Examples, a tire having good balance of low fuel cost, safety and the like can be obtained by using the rubber composition containing this polymer.

When the amount of the added halogenated tin compound is outside of the range of less than 0.25 to 0.18 or more mol equivalent in the case of SnX$_4$ and outside of the range of less than 0.5 mol to 0.12 or more mol equivalent in the case of SnX2 (Comparative Example 17 and Comparative Example 18, respectively), the rubber compositions obtained by using the polymer prepared under these conditions are shown to have inferior tensile strength, tan δ at 50° C. and pico abrasion resistance compared with the rubber compositions of the present invention. It can be understood that a preferable range of the amount of addition of halogenated tin compounds exists and that the range is very important.

When the molecular weights of the polymers are compared by the number average molecular weights, the polymer having the extremely high molecular weight (110×10$^4$) in Comparative Example 19 and the polymer having the low molecular weight (9×10$^4$) in Comparative Example 20 have inferior elongation, tan δ at 50° C. and pico abrasion resistance compared with the polymer in Example 34 having the molecular weight of 41×10$^4$. When the molecular weight is low in particular, the polymer is inferior not only in tan δ at 50° C. and pico abrasion resistance but also in tensile strength and wet skid resistance compared with the polymer in Example 34 of the invention. The weight average molecular weights of the polymers in Comparative Example 19, Comparative Example 20 and Example 34 are 190×10$^4$, 16×10$^4$ and 61×10$^4$, respectively, and these data show that the molecular distributions are wide. Therefore, it is necessary to take both of the number average molecular weight and the weight average molecular weight into consideration. In any case, the above results show that there exists a preferable range of the molecular weight.

When the content of the polymer of the invention in 100 weight parts of the rubber material in Example 36 (40 weight parts) is compared to that of Comparative Example 22 (20 weight parts), the rubber composition of the invention showes a better wet skid resistance value than that of Comparative Example 22. Furthermore, other properties are also better in Example 36 of the present invention, showing that the polymer of the present invention is excellent.

While the invention has been shown and described in detail with reference to preferred embodiments thereof, it will be understood by those skilled in the art that the foregoing and other changes in form and details can be made therein without departing from the spirit and scope of the invention.

What is claimed is:

1. A method of producing a polymer, comprising the steps of polymerizing a conjugated diene monomer or a mixture of a conjugated diene monomer and a vinylaromatic hydrocarbon monomer in a hydrocarbon solvent using an initiator comprising an organolithium compound and adding an organotin compound during a period of growth of the polymer chain between a time immediately after the start of the polymerization to a time before the end of the polymerization; wherein the organolithium compound is selected from the group consisting of alkyllithium, alkylenedilithium, phenyllithium and stilbenedilithium and the organotin compound is represented by the formula SnR$_4$, wherein R are the same or different molecular structure groups each having a connecting part to tin selected from the group consisting of a molecular structure containing an allyl group, a molecular structure containing a benzyl group and a molecular structure containing a phenyl group.

2. The method of producing a polymer according to claim 1, further comprising the step of adding a modifier after finishing polymerization, wherein the modifier is a compound selected from the group consisting of a tin compound, a compound containing isocyanide groups and a compound containing a —CM—N< linkage, wherein M is oxygen or sulfur.

3. The method of producing a polymer according to claim 1, wherein the polymer is a polymer of butadiene or a copolymer of butadiene and styrene.

4. The method of producing a polymer according to claim 1, wherein R in the organotin compound is a molecular structure containing an allyl group, wherein the allyl group is selected from the group consisting of an allylic group, a polymeric group having a diene polymer unit and an oligomeric group having a diene oligomer unit.

5. The method of producing a polymer according to claim 4, wherein the allylic group is an allyl group.

6. The method of producing a polymer according to claim 4, wherein the polymeric group having a diene polymer unit is a polybutadiene group.

7. The method of producing a polymer according to claim 1, wherein R in the organotin compound is a molecular structure containing a benzyl group selected from the group consisting of a benzylic group, a polymeric group having a vinylaromatic hydrocarbon polymer unit and an oligomeric group having a vinylaromatic hydrocarbon oligomer unit.

8. The method of producing a polymer according to claim 7, wherein the benzylic group is a benzylic group.

9. The method of producing a polymer according to claim 7, wherein the polymeric group having a vinylaromatic hydrocarbon polymer unit is a polystyrene group.

10. The method of producing a polymer according to claim 1, wherein R in the organotin compound is selected from the group consisting of a molecular structure containing a benzyl group and a molecular structure containing a phenyl group.

11. The method of producing a polymer according to claim 1, wherein R is a phenyl structure.

12. The method of producing a polymer according to claim 11, wherein R is a phenyl group.

13. A method of producing a polymer according to claim 1, wherein the R in the organotin compound include allyl structures and phenyl structures.

14. A method of producing a polymer, comprising the steps of:

polymerizing a conjugated diene monomer or a mixture of a conjugated diene monomer and a vinylaromatic hydrocarbon monomer in a hydrocarbon solvent using an initiator comprising an organolithium compound;

adding a halogenated tin compound represented by the formula SnX$_n$, wherein X is a halogen and n is 2, to the polymerization system during a period of growth of the polymer chain between a time immediately after the start of the polymerization to a time of 80% conversion, wherein the halogenated tin compound is added in an amount of less than 0.5 to 0.12 or more mol equivalent based on 1 mol equivalent of the lithium at the active end of the polymer; and forming a polymer containing 40% or more of a high molecular weight polymer containing a chain having tin-carbon linkages.

15. The method of producing a polymer according to claim 14, further comprising the step of adding a modifier after polymerization, wherein the modifier is a compound selected from the group consisting of a tin compound, a compound containing isocyanide groups and a compound containing a —CM—N< linkage, wherein M is oxygen or sulfur.

16. The method of producing a polymer according to claim 14, wherein the polymer is a polymer of butadiene or a copolymer of butadiene and styrene.

17. The method of producing a polymer according to claim 14, wherein X in the halogenated tin compound is chlorine or bromine.

18. The method of producing a polymer according to claim 14, wherein the halogenated tin compound is added to the polymerization system during a period of growth of the polymer chain between the time immediately after start of the polymerization to a time of 25% conversion.

19. A high molecular weight polymer, comprising 40% or more of a high molecular weight polymer containing a chain having tin-carbon linkages, the high molecular weight polymer being produced by polymerizing a conjugated diene monomer or a mixture of a conjugated diene monomer and a vinylaromatic hydrocarbon monomer in a hydrocarbon solvent using an initiator comprising an organolithium compound, and adding to the polymerization a halogenated tin compound expressed by the formula SnX$_n$, wherein X is a halogen and n is 2, and the halogenated tin compound is added to the polymerization system during a period of growth of the polymer chain between a time immediately after start of the polymerization to a time of 80% conversion in an amount of less than 0.5 to 0.12 or more mol equivalent based on 1 mol equivalent of the lithium at the active end of the polymer.

20. The high molecular weight polymer according to claim 19, wherein the high molecular weight polymer is a polymer of butadiene or a copolymer of butadiene and styrene.

21. The high molecular weight polymer according to claim 19, wherein X in the halogenated tin compound is chlorine or bromine.

22. The high molecular weight polymer according to claim 19, wherein the during halogenated tin compound is added to the polymerization system during the period of growth of the polymer chain between the time immediately after start of the polymerization to a time of 25% conversion.

23. A rubber composition for tires, comprising: 100 weight parts of a rubber material containing 30 weight parts or more of a high molecular weight polymer comprising 40% or more of a high molecular weight polymer containing a chain having tin-carbon linkages, the high molecular weight polymer being produced by polymerizing a conjugated diene monomer or a mixture of a conjugated diene monomer and a vinylaromatic hydrocarbon monomer in a hydrocarbon solvent using an initiator comprising an organolithium compound, and adding to the polymerization a halogenated tin compound represented by the formula $SnX_n$, wherein X is a halogen and n is 2, and the halogenated tin compound is added to the polymerization system during a period of growth of the polymer chain between a time immediately after start of the polymerization to a time of 80% conversion in an amount of less than 0.5 to 0.12 or more mol equivalent based on 1 mol equivalent of the lithium at the active end of the polymer;

20 to 100 weight parts of carbon black; and 0.1 to 5 weight parts of vulcanizing agents, based on 100 weight parts of the rubber material, respectively.

24. The rubber composition according to claim 23, wherein the high molecular weight polymer is produced by adding a modifier after finishing the polymerization, wherein the modifier is a compound selected from the group consisting of a tin compound, a compound containing isocyanide groups and a compound containing a — CM—N< linkage, wherein M is oxygen or sulfur.

25. The rubber composition according to claim 23, wherein the high molecular weight polymer is a polymer of butadiene or a copolymer of butadiene and styrene.

26. The rubber composition according to claim 23, wherein X in the halogenated tin compound is chlorine or bromine.

27. The rubber composition according to claim 23, wherein the halogenated tin compound is added to the polymerization system in the period of growth of the polymer chain between the time immediately after the start of the polymerization to a time of 25% conversion.

\* \* \* \* \*